United States Patent
Wallach et al.

(10) Patent No.: US 7,133,069 B2
(45) Date of Patent: Nov. 7, 2006

(54) SYSTEM AND METHOD TO INCREASE EFFECTIVE DYNAMIC RANGE OF IMAGE SENSORS

(75) Inventors: Bret A. Wallach, San Diego, CA (US); Harvey A. Koselka, Trabuco Canyon, CA (US)

(73) Assignee: Vision Robotics, Inc., San Diego, CA (US)

( * ) Notice: Subject to any disclaimer, the term of this patent is extended or adjusted under 35 U.S.C. 154(b) by 225 days.

(21) Appl. No.: 10/100,221

(22) Filed: Mar. 15, 2002

(65) Prior Publication Data

US 2002/0176010 A1 Nov. 28, 2002

Related U.S. Application Data

(60) Provisional application No. 60/276,366, filed on Mar. 16, 2001.

(51) Int. Cl.
*H04N 5/225* (2006.01)
*H04N 5/235* (2006.01)

(52) U.S. Cl. .................. 348/218.1; 348/229.1

(58) Field of Classification Search ............ 348/229.1, 348/362, 221.1, 218.1; 382/284
See application file for complete search history.

(56) References Cited

U.S. PATENT DOCUMENTS

| | | | | |
|---|---|---|---|---|
| 4,868,752 A * | 9/1989 | Fujii et al. ..................... 701/28 |
| 5,101,276 A * | 3/1992 | Ohta ....................... 348/221.1 |
| 5,247,366 A * | 9/1993 | Ginosar et al. ............. 348/256 |
| 5,309,243 A * | 5/1994 | Tsai ........................ 348/221.1 |
| 5,517,242 A | 5/1996 | Yamada et al. |
| 5,712,682 A | 1/1998 | Hannah |
| 5,801,773 A * | 9/1998 | Ikeda ...................... 348/229.1 |
| 5,818,975 A | 10/1998 | Goodwin et al. |
| 5,828,793 A * | 10/1998 | Mann ......................... 382/284 |
| 5,929,908 A | 7/1999 | Takahashi et al. |
| 5,969,761 A | 10/1999 | Takahashi et al. |
| 6,040,858 A | 3/2000 | Ikeda |
| 6,184,933 B1 | 2/2001 | Ogura |
| 6,204,881 B1* | 3/2001 | Ikeda et al. ................. 348/362 |
| 6,374,155 B1 | 4/2002 | Wallach et al. |
| 2002/0176010 A1* | 11/2002 | Wallach et al. .......... 348/229.1 |

FOREIGN PATENT DOCUMENTS

| JP | 63306777 | 12/1988 |
|---|---|---|
| WO | WO 01/37060 A1 | 5/2001 |

OTHER PUBLICATIONS

Duda et al., "Pattern Classification and Scene Analysis," John Wiley & Sons, table of contents, 1973.
Horn, "Robot Vision," MIT Press and McGraw-Hill, table of contents, 1986.
Bergholm et al., "A 'Theory' of Optical Flow," Computer Visions, Graphics, and Image Processing: Image Understanding, vol. 53, pp. 171-188, Mar. 1991.

(Continued)

*Primary Examiner*—David Ometz
*Assistant Examiner*—James M. Hannett
(74) *Attorney, Agent, or Firm*—Knobbe Martens Olson & Bear, LLP

(57) ABSTRACT

A system and method of increasing the dynamic range of image sensors by controlling the exposure (either electronically or mechanically) of multiple images and optionally forming a composite image from the properly exposed areas of the multiple images of varying exposure settings. Certain embodiments of the system and method utilize image processing techniques to determine the various exposure settings and to form the optional composite image. The properly exposed areas can be used directly by machine vision applications.

99 Claims, 12 Drawing Sheets

OTHER PUBLICATIONS

Klette et al., "Computer Vision," Springer-Verlag Singapore Pte. Limited, table of contents, 1998.

Umbaugh, "Computer Vision and Image Processing: A Practical Approach Using CVIPtools," Prentice Hall, table of contents, 1998.

Baker et al., "Super-Resolution Optical Flow," Tech Report CMU-RI-TR-99-36, Robotics Institute, Carnegie Mellon University, Oct. 1999.

Debevec et al., "Recovering High Dynamic Range Radiance Maps from Photographs," Computer Science Division, University of California at Berkeley, 1997.

* cited by examiner

SYSTEM AND METHOD TO INCREASE EFFECTIVE DYNAMIC RANGE OF IMAGE SENSORS

RELATED APPLICATION

This application claims the benefit under 35 U.S.C. § 119(e) of U.S. Provisional Application No. 60/276,366, filed Mar. 16, 2001 and titled "METHOD FOR RECURSIVE EXPOSURES TO INCREASE EFFECTIVE DYNAMIC RANGE OF CAMERAS," which is hereby incorporated by reference in its entirety. This application is related to U.S. patent application Ser. No. 09/449,177, filed Nov. 24, 1999 and titled "AUTONOMOUS MULTI-PLATFORM ROBOT SYSTEM," which is hereby incorporated by reference in its entirety.

BACKGROUND OF THE INVENTION

1. Field of the Invention

The present invention generally relates to the field of digital image processing. More particularly, the invention relates to providing a system and method for increasing the effective dynamic range of image sensors by combining information from multiple images of the same scene taken at varying exposures via digital image processing.

2. Description of the Related Technology

Many applications exist that require analyzing images to extract information. For example, a mobile robot that uses vision (one form of "machine vision", which is described in greater detail below) will take and analyze a series of digital images looking for objects, both landmarks and obstacles, in order to plan its movements. Both computers and humans analyze images from security systems to assure that everything is in order. Images from satellites are analyzed by looking for objects or patterns or by comparing similar images taken at different times. Typically, greater contrast (i.e., dynamic range) in an image increases the information that can be extracted from the image because edges and other details are better defined. In machine vision, this higher contrast enables simplified edge detection and object localization.

The human vision system has a wide dynamic range and is very good at extracting information from a scene that includes both very bright and very dark areas. However, high contrast often overwhelms the dynamic range of other image sensors, for example digital or analog cameras, such that substantial areas are either saturated or very dark. For a digital image, saturated areas are those that contain pixels at or near the maximum brightness, while dark areas are those that contain pixels at or near the minimum brightness. Typically, saturated areas result from overexposure, while dark areas result from underexposure. It is generally very difficult to effectively analyze saturated and dark areas. High cost cameras typically have a greater dynamic range, but are prohibitively expensive for many applications.

Exposure control is one method to adjust contrast in an image. Current auto exposure systems are generally very accurate. Typical auto exposure systems use reflected-light exposure meters within the camera to detect the level of light and electronically adjust the camera's shutter speed and/or aperture to the optimal exposure setting. Photocells are typically used as exposure meters, with the silicon photo-diode being the most common. Image sensors are typically their own exposure meters.

While these light averaging exposure control systems do a good job of selecting the correct nominal exposure, many images still contain overexposed (saturated) and underexposed (dark) areas. For example, in a photographic image that includes a light, the majority of the image may appear correctly exposed, but the area near the light will often be overexposed (saturated), appearing bright white and without detail.

Some of the digital cameras presently on the market have enhanced auto exposure systems. One such system allows the user to automatically take the same shot at three exposures with one press of the trigger (referred to as bracketing). The user can then choose the best-exposed shot of the three. These systems also allow the user to select the range between the three exposures. However, local bright and dark areas within the image may still make it impossible for any single exposure to effectively capture the entire image. Typically, photographers have used external lights or flash bulbs to improve the picture contrast by increasing the dynamic range of the scene.

Machine vision may refer to the analysis by a system (i.e., machine) of an image or sequence of images to produce useful descriptions of what is imaged in order to accomplish a given task. For example, machine vision may include extracting facial characteristics from an image in order to match a person in an image with a database of facial characteristics, or determining the distance to an object from two stereo images in order for a robot to determine how far it can move forward without hitting the object. Following are examples of applications that may incorporate machine vision processing:

1. Determining a map of an environment in order for a robot to move about autonomously without running into objects;
2. Identifying people in an image to determine who is at a certain location;
3. Tracking an object across multiple images to determine where the object is in the images (e.g., determining where a soccer ball is in the images so that it can be replaced with an advertisement in the shape of the soccer ball in the images);
4. Determining the location, orientation, and size of an object so that it can be automatically manipulated by a machine (e.g., a robotic arm needs to pick up an object from an assembly line, and the object can be one of many types and different places/orientations on a conveyor belt);
5. Tracking an object across multiple images to determine where it is in the environment (e.g., what are the visual characteristics, location, speed, and trajectory of an incoming object to determine whether it is a missile or a plane); and
6. Analyzing medical images in order to find likely areas of disease.

In machine vision applications, one example being robotics, it is advantageous to have the ability to view a whole scene with all areas having sufficient contrast to recognize and analyze the features contained therein. In vision robotics, the robots navigate through the environment by recognizing objects, open space, patterns, walls, and the like. One implementation of robotic vision employs two cameras for stereo vision to determine the distance to objects. Poorly exposed images that lack sufficient dynamic range can lead to the robots either getting lost or failing to adequately locate and avoid objects or dangers such as an open stairwell. Therefore, there is a need in the vision robotics and image sensing and processing technology for increasing the effective dynamic range of image sensors. Such an enhancement in effective dynamic range would be useful for numerous applications in addition to the robotic application mentioned above.

SUMMARY OF CERTAIN INVENTIVE ASPECTS

The present invention is directed to a system and method of increasing the effective dynamic range of image sensors with computer controllable exposure (either electronic or mechanical). The present invention overcomes limitations with traditional and enhanced automatic exposure systems described above by digitally processing a plurality of images collected from the image sensors with different exposure settings.

One aspect of the invention includes a method of effectively increasing the dynamic range of an image sensor, comprising capturing multiple images of a scene taken at different exposures, searching a selected image of the multiple images for overexposed and underexposed portions based on a pixel value indicative of luminance, analyzing portions in other images of the multiple images taken at lower exposures corresponding spatially to the overexposed portions in the selected image, analyzing portions in other images of the multiple images taken at higher exposures corresponding spatially to the underexposed portions in the selected image, and processing at least one of the analyzed portions with a machine vision application. This additionally comprises the method wherein the image sensor is a digital camera. This additionally comprises the method wherein the portions can be overlapping, non-overlapping, or a combination of overlapping and non-overlapping.

An additional aspect of the invention includes a method of effectively increasing the dynamic range of an image sensor, comprising obtaining an image of a scene, analyzing the image to identify one or more regions that are either too bright or too dark, wherein any one of the regions includes a plurality of pixels, for any identified region that is identified as being too bright, obtaining a reduced exposure image, for any identified region that is identified as being too dark, obtaining an increased exposure image, and processing one or more of the properly exposed regions of the image and one or more properly exposed regions in the reduced and/or increased exposure images. This additionally comprises the method wherein the image sensor is a digital camera. This additionally comprises the method wherein the regions can be overlapping, non-overlapping, or a combination of overlapping and non-overlapping. This additionally comprises the method of obtaining another image at a reduced exposure if the image sensor has a lower exposure setting available. This additionally comprises the method of obtaining another image at an increased exposure if the image sensor has a higher exposure setting available. This additionally comprises the method wherein the obtaining a reduced exposure image and/or obtaining an increased exposure image elements are repeated as long as an average pixel value of any region is not within a selected limit.

This additionally comprises the method of analyzing the properly exposed regions in the reduced and/or increased exposure images to identify one or more subregions that are either too bright or too dark, for any identified subregion that is too bright, obtaining another reduced exposure image, for any identified subregion that is too dark, obtaining another increased exposure image, and processing the properly exposed region and one or more properly exposed subregions in the reduced and/or increased exposure images. This additionally comprises the method wherein the image sensor is mounted on a mobile robot and wherein the method is repeated for a plurality of scenes looking for objects, including both landmarks and obstacles, to plan the movement of the mobile robot. This additionally comprises the method wherein the camera includes a CCD or CMOS sensor.

An additional aspect of the invention includes a computer program storage medium storing instructions that when executed by a processor perform a method of increasing the dynamic range of an image sensor, comprising obtaining a base image of a scene, analyzing the base image to identify one or more regions that are either too bright or too dark, wherein any one of the regions includes a plurality of pixels, for any identified region that is too bright, obtaining a reduced exposure image, for any identified region that is too dark, obtaining an increased exposure image, and processing the base image and one or more properly exposed regions in the reduced and/or increased exposure images. This additionally comprises the storage medium wherein the image sensor is a digital camera. This additionally comprises the storage medium wherein the regions can be overlapping, non-overlapping, or a combination of overlapping and non-overlapping.

An additional aspect of the invention includes an image sensing system for effectively increasing the dynamic range of an image sensor, comprising a means for acquiring an image of a scene a plurality of times with different exposures to obtain a plurality of images, and a means for segmenting the images into a plurality of image regions, wherein each region is indicative of a selected dynamic range, and wherein any one or more of the plurality of image regions are processed with a machine vision application.

This additionally comprises the system wherein the image sensor is a digital camera. This additionally comprises the system wherein the image sensing system includes at least two image sensors offset from each other. This additionally comprises the system wherein the machine vision application utilizes corresponding image segments from the at least two image sensors to determine distance and/or orientation from the camera system to the object or feature being imaged. This additionally comprises the system wherein the imaging sensing system generates a composite image for feature extraction including object identification and localization, edge detection and pattern recognition. This additionally comprises the system wherein the imaging sensing system generates a composite image for feature extraction including object identification and localization, edge detection and pattern recognition. This additionally comprises the system wherein the regions can be overlapping, non-overlapping, or a combination of overlapping and non-overlapping.

An additional aspect of the invention includes a method of effectively increasing the dynamic range of an image sensor, comprising acquiring an image of a scene a plurality of times with different exposures to obtain a plurality of images, segmenting the images into a plurality of image regions, wherein each region is indicative of a selected dynamic range, and processing any one or more of the plurality of image regions with a machine vision application. This additionally comprises the method wherein the image sensor is a digital camera.

An additional aspect of the invention includes an image acquisition system for effectively increasing the dynamic range of an image sensor, comprising a means for acquiring a plurality of images of a scene, each image having a different exposure, and a means for obtaining a plurality of image regions, wherein each region contains portions of a particular image with good dynamic range from the plurality of images, and wherein any one or more of the plurality of image regions are processed with a machine vision application.

This additionally comprises a means for moving the system from one location to another location so as to acquire images of different scenes. This additionally comprises the system wherein the image sensor is a digital camera. This additionally comprises the system wherein the image sensing system contains at least two image sensors offset from each other. This additionally comprises the system wherein the machine vision application utilizes corresponding image segments from the at least two image sensors to determine distance and/or orientation from the camera system to the object or feature being imaged. This additionally comprises the system wherein the imaging sensing system generates a composite image for feature extraction including object identification and localization, edge detection and pattern recognition. This additionally comprises the system wherein the imaging sensing system generates a composite image for feature extraction including object identification and localization, edge detection and pattern recognition.

An additional aspect of the invention includes a method of effectively increasing the dynamic range of an image sensor, comprising capturing multiple images of a scene taken in different lighting conditions, searching an image of the multiple images for overexposed and underexposed portions based on a pixel value indicative of luminance, reanalyzing the overexposed portions and the underexposed portions in the selected image corresponding to a spatially related portion in other images of the multiple images taken in different lighting conditions, and processing at least one of the reanalyzed portions with a machine vision application. This additionally comprises the method wherein the image sensor is a digital camera. This additionally comprises the method wherein the portions can be overlapping, non-overlapping, or a combination of overlapping and non-overlapping. This additionally comprises the method wherein the different light conditions include one or more flashes of light.

An additional aspect of the invention includes an image sensing system for effectively increasing the dynamic range of one or more image sensors, comprising a means for acquiring an image of a scene a plurality of times under different lighting conditions so as to obtain a plurality of images, and a means for segmenting the images into a plurality of image regions, wherein each region is indicative of a selected dynamic range, and wherein any one or more of the plurality of image regions are processed with a machine vision application.

This additionally comprises the system wherein the one or more image sensor is one or more digital camera. This additionally comprises the system wherein the different lighting conditions include the use of one or more flashes of light. This additionally comprises the system wherein the image sensing system contains at least two image sensors offset from each other. This additionally comprises the system wherein the machine vision application utilizes corresponding image segments from the at least two image sensors to determine distance and/or orientation from the camera system to the object or feature being imaged. This additionally comprises the system wherein the imaging sensing system generates a composite image for feature extraction including object identification and localization, edge detection and pattern recognition. This additionally comprises the system wherein the imaging sensing system generates a composite image for feature extraction including object identification and localization, edge detection and pattern recognition.

BRIEF DESCRIPTION OF THE DRAWINGS

The above and other aspects, features and advantages of the invention will be better understood by referring to the following detailed description, which should be read in conjunction with the accompanying drawings. These drawings and the associated description are provided to illustrate certain embodiments of the invention, and not to limit the scope of the invention.

DETAILED DESCRIPTION OF CERTAIN EMBODIMENTS

Figure 1A:
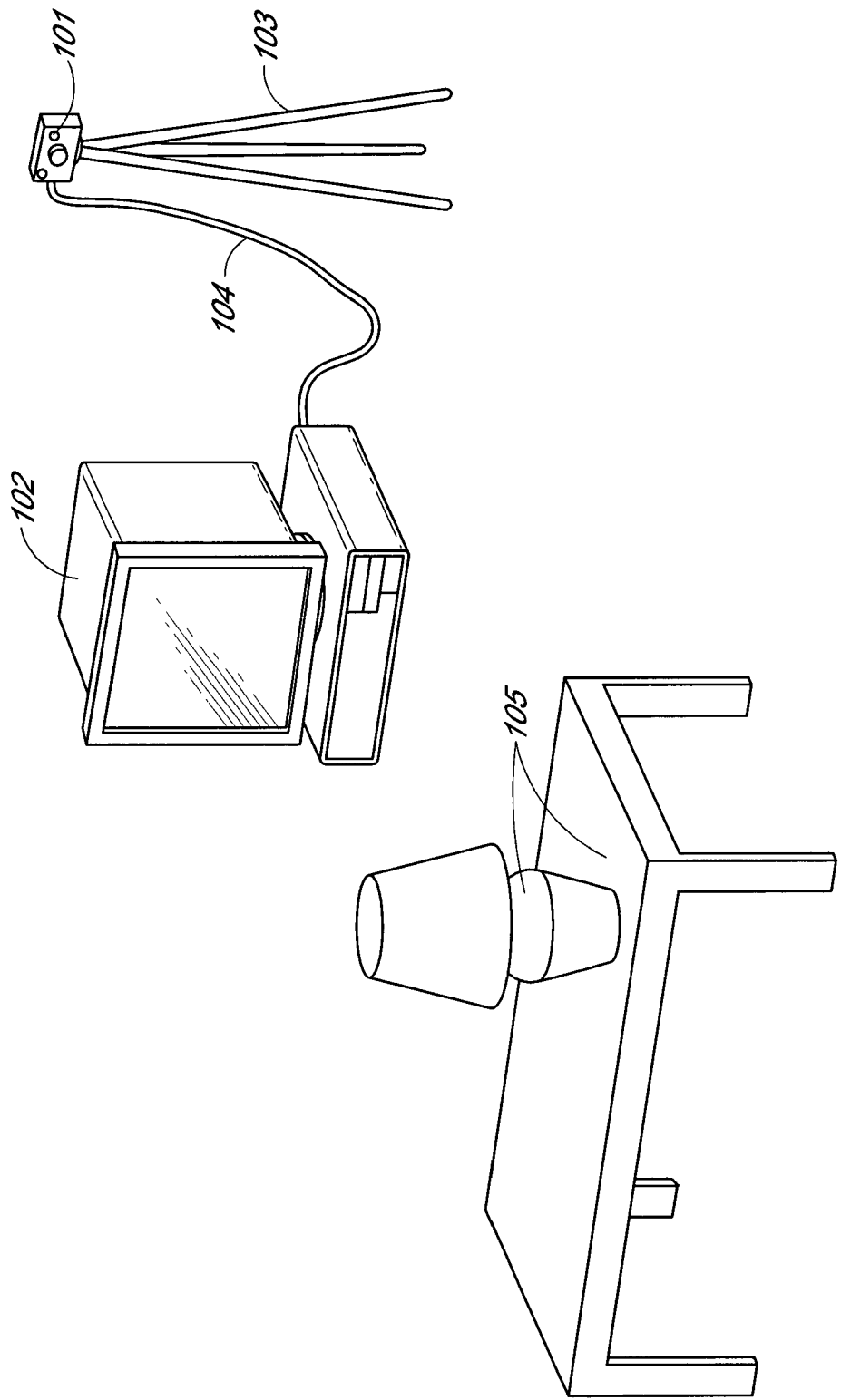
FIG. 1A is a diagram of one embodiment of an image sensing and processing system utilizing a single image sensor.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

An embodiment of the present invention provides a mechanism for increasing the effective dynamic range of an image sensor by combining information from multiple images of the same scene, with the different images taken at different exposures. This embodiment includes one or more image sensors, for example a digital camera, that can remain effectively stationary long enough to obtain multiple images of the same scene. Such a digital imaging process would not normally take a long time, as computers can typically complete the process in a fraction of second. Therefore, in various embodiments, the image sensor can be portable and rest on the ground, on a tripod or be integrated in a mobile robot. Other embodiments may provide other configurations of the image sensor. The initial exposure setting may be computer controlled. However, an auto exposure system may also be used for the base, i.e., first, image. The exposure control may be either electronic or mechanical, and may utilize a computer controllable iris.

Certain embodiments also include a computer to perform digital image processing on the images captured by the image sensor. The image sensor and computer communicate for the exchange of data, for example by commonly accessible computer memory or via a network connection. In one embodiment, the computer may consist of a printed circuit board with the necessary components within the image sensor housing. In the case of mobile robotics, a robot typically includes at least a computer, a drive system and an image sensor, for example a camera, with a mechanism for exposure control.

In one embodiment, the process begins with the image sensor system taking a photographic image of a scene, referred to as a base image. The base image is searched for areas that are saturated or nearly saturated. For each area that is saturated or nearly saturated, additional images of the same scene are collected at successively lower (e.g., darker) exposures until the average pixel value of the previously saturated area is near the middle of the pixel value range. For each area that is black (i.e., underexposed) or nearly black, additional images are collected at successively higher (e.g., lighter) exposures until the average pixel value of the previously black area is near the middle of the pixel value range.

Recursive exposure is a way to further segment a poorly exposed region of an image. Additional images at various exposures need not have good contrast for the entire region. Portions of multiple images may be used to provide a series of image segments that together cover an entire region of interest.

In another embodiment, instead of recursively adjusting the exposure and taking as many photographs as necessary to refine the image, the computer may direct the image sensor to take a predetermined number of pictures at different exposures simultaneously or sequentially. In this embodiment, instead of optimizing the exposure of each region, the computer selects the best exposure for each region from the series of images. The computer-controlled image sensor may include a specialized image sensing mechanism to automatically take the number of pictures at different exposures.

In an example where the image is taken on a bright day from the outside looking inside through a doorway and into a dark room, a typical automatic exposure image sensing system selects the appropriate exposure for the outside of the building. However, in this situation, objects and/or features inside the room appear black (i.e., underexposed). In one embodiment, the computer image processing system analyzes the image and determines that everything within the doorway is dark. The picture is retaken at a higher exposure and the doorway portion of the image is reanalyzed. If the average pixel value of the image is still below a predetermined threshold, the computer continue to direct the image sensing system to take additional images at different higher exposures until the area within the doorway is adequately exposed or the image sensor has reached a maximum exposure setting.

From such recursive exposure techniques, a series of images are obtained that collectively contain sufficient contrast for each region of the image. There are various embodiments for the image segmentation techniques. For example, in one embodiment, the regions are tracked via the particular pixels that are properly and adequately exposed in each image. Alternatively, many possible shapes may be used to demarcate the region, for example rectangles, polygons, ellipses, splines (i.e., a smooth curve that passes through two or more points, often generated with mathematical formulas), and the like. In this embodiment, the properly exposed segment of each image can then be analyzed by the particular application. In an embodiment utilizing machine vision, the segmented regions may overlap or even contain voids that are not properly exposed in any image. In this way, a robot uses all the information it can retrieve, but due to the statistical nature of the image processing algorithms, it can work without 100% coverage of the given scene.

In an alternative embodiment, the system utilizes multiple image sensors, for example digital cameras, as is required for certain applications such as stereo vision. The exposure analysis can be performed independently for the images captured by each camera, or the exposures can be chosen to be the same for corresponding regions in images from different cameras.

In a further embodiment, the contrast may be varied between images using lights or a flash bulb. Image processing applications are typically not limited to the visual light spectrum. For example, cameras using complementary metal oxide semiconductor (CMOS) devices to capture images can operate in the infrared light region, and thus exposure settings in the infrared range can be used. As infrared light cannot be seen by the human eye, the camera system can have lights or flashes that are therefore invisible to the human eye. Other cameras are available that use charge-coupled devices (CCD) to capture images.

In another embodiment, not all the photographs need to be taken of the identical scene. This situation may arise when either the image sensor or the scene cannot remain stationary, such that each image is of a slightly different scene. This embodiment requires performing significantly more image processing as the computer must correlate the objects and features in each picture since they are not in the same position in the images. There are correlation techniques known in the technology, such as optical flow for matching the objects in images. In yet another embodiment, analog cameras are used as the image sensor, requiring that complete images be taken at different exposures and scanned into a computer in a digital format prior to performing the exposure analysis techniques.

In an embodiment utilizing application of machine vision, image processing algorithms executing on the computer analyze each subregion separately, or corresponding subregions in the case of multiple image sensor applications. In an embodiment in which a human analyzes the images, the computer algorithms may splice the properly exposed regions of multiple images into a single image. Although such a spliced image is likely to be disjoint, the various regions of the image are properly exposed so that objects and/or features in the entire image may be processed. The properly exposed regions can be overlapping, non-overlapping, of a combination of overlapping and non-overlapping.

In an embodiment utilizing stereo vision, for example in vision based robotics, the computer matches objects and/or features in images from one of its image sensors to corresponding objects and/or features in images from another image sensor. The relative location of the objects and/or features in each of the images may be used to determine the robot's distance and orientation relative to the object and/or feature. In this embodiment, a properly exposed region is one in which an object and/or feature has sufficient contrast so that it can be matched between the images of both stereo image sensors.

FIG. 1A is a diagram of one embodiment of an image sensing and processing system utilizing a single image sensor 101. In this embodiment, the image sensor 101 is connected to a computer 102 via a cable 104. Although any image sensor capturing images in a digital format may be used, a type of image sensor presently in widespread use is a digital camera. Multiple image sensors 101 may be used for applications such as stereo vision. The cable 104 shown in FIG. 1A could be one or more of many types of interface cables, for example a serial interface cable (e.g., RS-232, EIA-232, or RS-422), a parallel interface cable, a USB (Universal Serial Bus) interface cable, a network interface cable (e.g., Ethernet or TCP/IP), or any other cable capable of connecting multiple devices to allow data communication between the devices. In other embodiments, an analog camera image sensor 101 is used to capture images using traditional photographic film format. The photographic film images are scanned into a digital format and stored by the computer 102. However, this approach would be more cumbersome and time consuming than using image sensors that capture images directly in a digital format.

The computer 102 shown in the embodiment of FIG. 1A is a desktop personal computer (PC), but in other embodiments the computer 102 could also be, for example, a dedicated printed circuit board or a single integrated circuit having only the hardware required for the image processing. In further embodiments, the image sensor 101 and the computer 102 can be integrated into a single machine or unit, thereby potentially eliminating the presence of the cable 104 connecting them. In still further embodiments, a wireless link may be substituted for the cable 104 shown in FIG. 1A.

FIG. 1A shows the image sensor 101, for example a camera, being mounted on a tripod 103, which is widely used in the photographic technology for securing and minimizing movement of the camera 101 while an image is captured. The use of the tripod 103 is beneficial to ensure that the images are substantially identical except for the varying exposures. FIG. 1A additionally shows an example of a scene containing objects 105 that may be in a scene, for example a lamp and a table in this example. The typical subjects for multiple image processing are images having stationary objects 105 where the scenes are captured within a relatively short time period. However, the image processing techniques described herein may be applied to photographs taken at different times, having the added benefit of lighting variations in the different images. The recursive exposure technique may also be applied to dynamic scenes having objects and/or features that are in different locations in the multiple images. In this case, additional processing is required to correlate the objects that have moved between images.

Figure 1B:
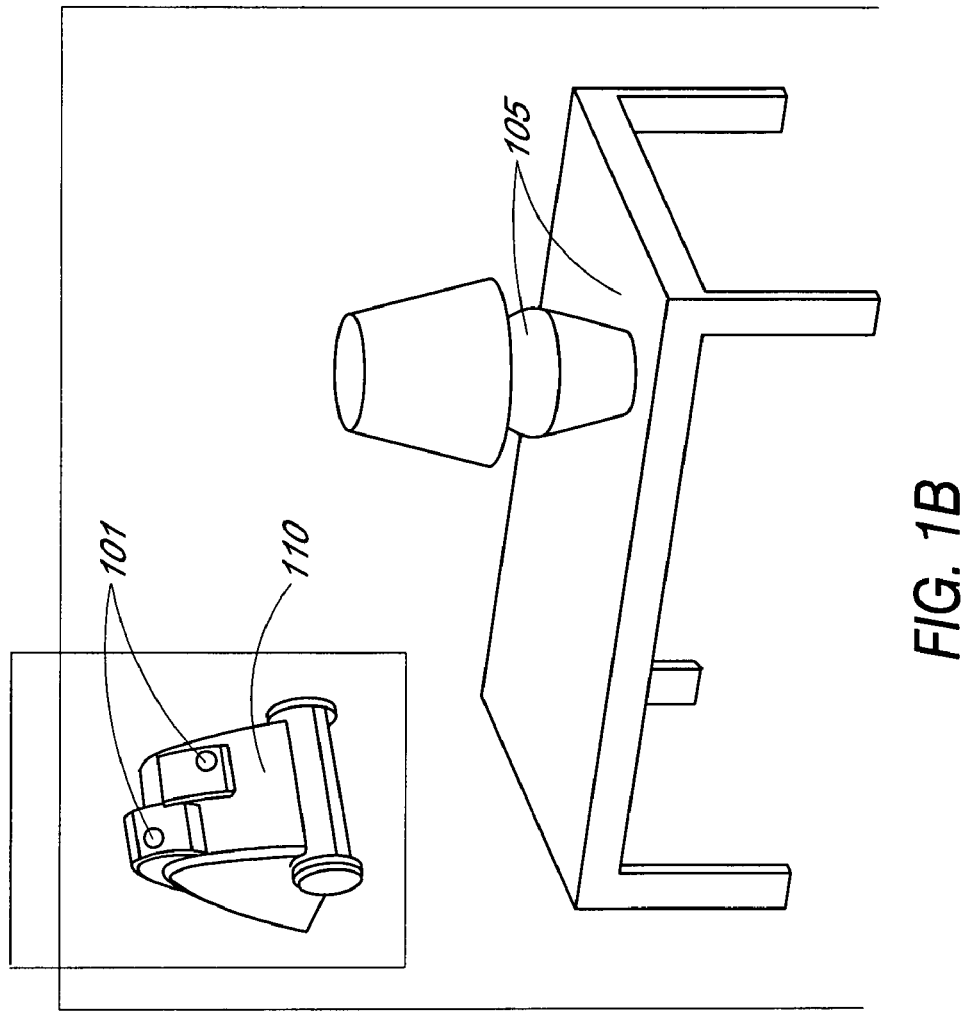
FIG. 1B is a diagram of one embodiment of the image sensing and processing system utilizing multiple image sensors mounted on a mobile robotic device.

FIG. 1B is a diagram of one embodiment of the image sensing and processing system utilizing multiple image sensors 101 mounted on a mobile robotic device 110. FIG. 1B shows a robot 110 having two image sensors 101, but other embodiments are contemplated which have only a single image sensor 101 (as shown in FIG. 1A) or more than two image sensors 101 (configuration not shown). The two image sensors 101 shown in FIG. 1B are capable of taking multiple images of the objects 105 of the scene at approximately the same time or at different times and with the same or different exposure settings.

In one embodiment as shown in FIG. 1B, one or more cameras 101 can be mounted on a mobile robot 110, in which case the image processing method is repeated for a plurality of scenes looking for objects 105, including both landmark and obstacles, to plan the robot's 110 movement. Mobile robots 110 are described in Applicant's co-pending patent application, U.S. patent application Ser. No. 09/449,177, which is hereby incorporated by reference in its entirety.

Figure 2:
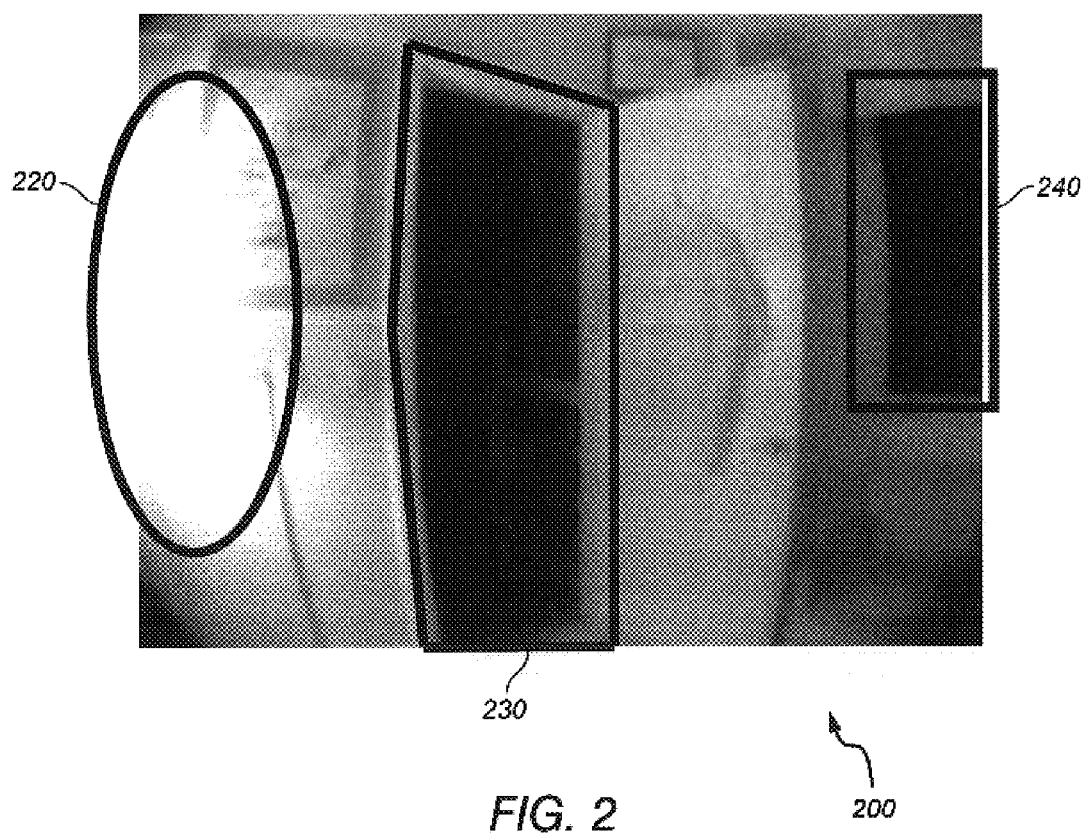
FIG. 2 is a digital image of a scene, taken at the nominal exposure chosen by an automatic exposure system of the image sensor, for use as a base image.

FIG. 2 is a digital image of a scene, taken at the nominal exposure chosen by an automatic exposure system of the image sensor 101, for use as a base image 200. Many areas of the base image 200 have the correct exposure and are clear in the photograph, such as, for example, the shirt hanging on the door 210. In the base image 200 shown in FIG. 2, it is also possible to see the design on the shirt and the print on the window shade. However, the area behind the lamp 220 is saturated (i.e., overly bright or overexposed), while the room behind the door 230 and the window 240 are overly dark (i.e., underexposed). In the base image 200 example shown in FIG. 2, the area behind the lamp 220 is the only overly bright area.

Figure 3:
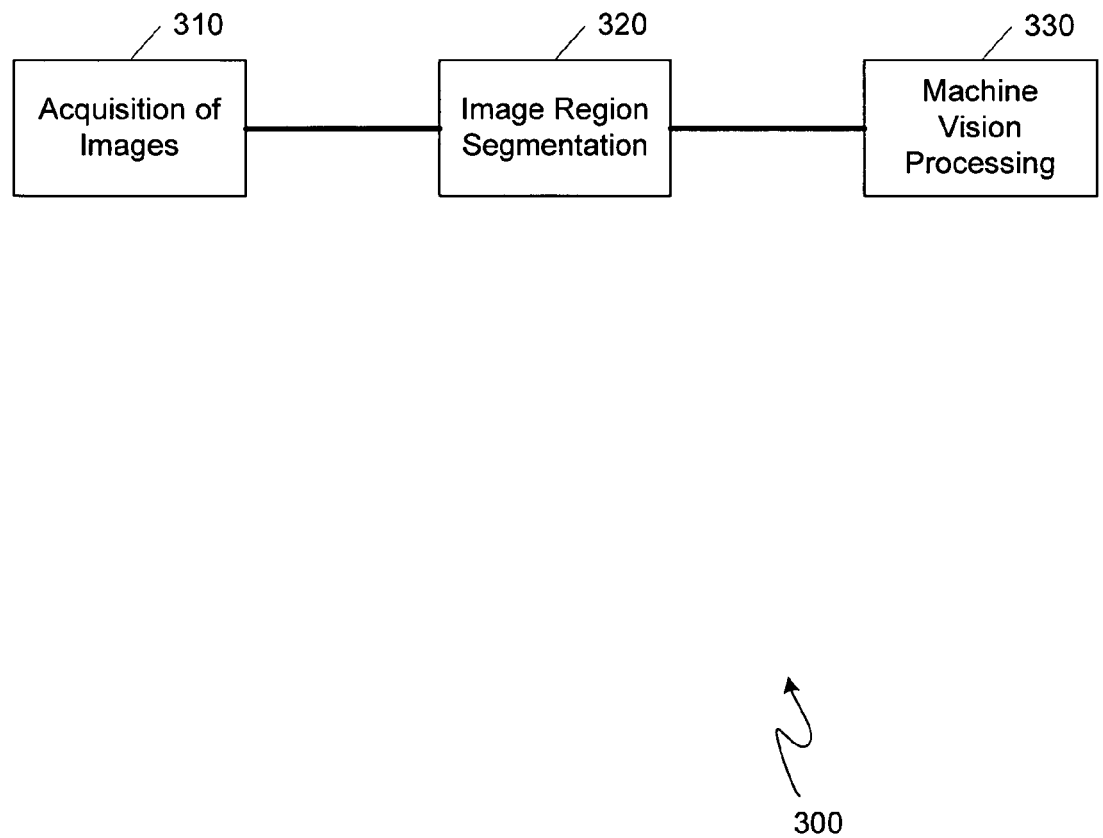
FIG. 3 is a system diagram of the modules in one embodiment of the image sensing and processing system.

FIG. 3 is a system diagram of the modules 300 in one embodiment of the image sensing and processing system. In this embodiment, an acquisition of a plurality of images module 310 is included. The module 310 is in data communication with an image region segmentation module 320. The module 320 is in further data communication with a machine vision processing module 330. The data communication may take many forms, including, for example, commonly accessible computer memory or a network connection, to name just a few. For more information on machine vision processing algorithms, see, for example, B. K. P. Horn, "Robot Vision," MIT Press and McGraw-Hill (1986), Klette, Schluns & Koschan, "Computer Vision," Springer-Verlag Singapore Pte. Limited (1998), Duda & Hart, "Pattern Classification and Scene Analysis," John Wiley & Sons (1973), and S. E. Umbaugh, "Computer Vision and Image Processing," Prentice Hall (1998), all of which are hereby incorporated by reference in their entirety.

Figure 4:
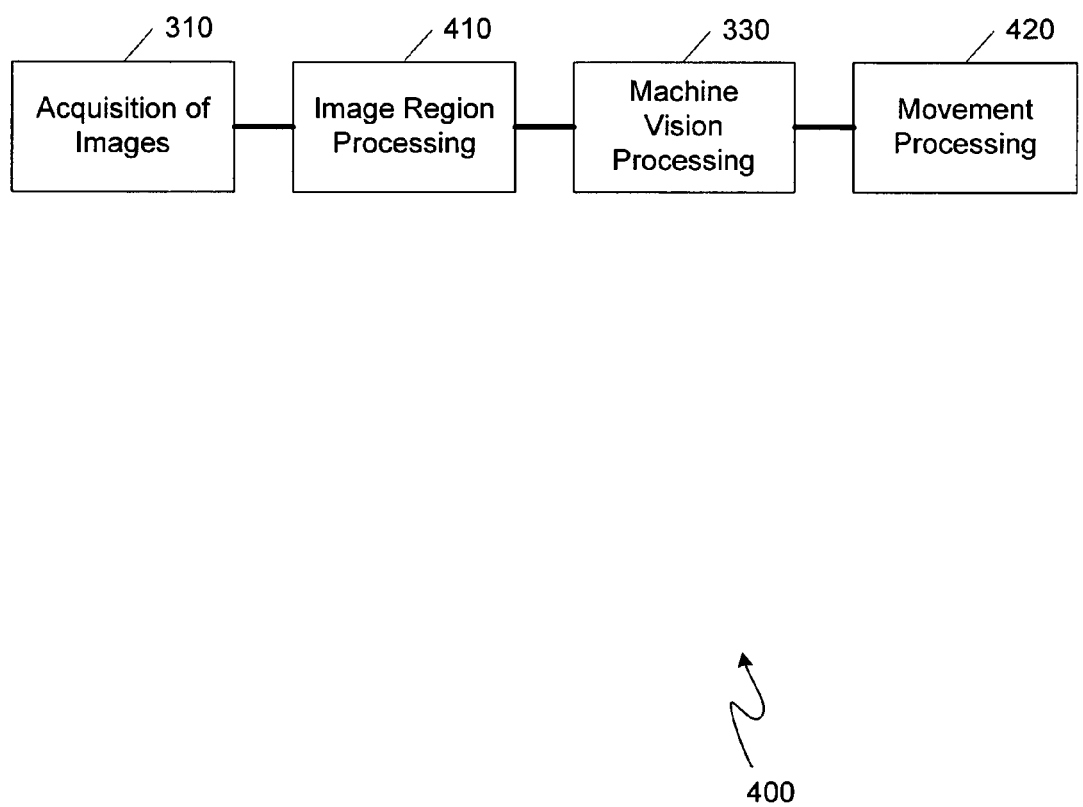
FIG. 4 is a system diagram of the modules in a further embodiment of the image sensing and processing system.

FIG. 4 is a system diagram of the modules 400 in a further embodiment of the image sensing and processing system. In this embodiment, the acquisition of a plurality of images module 310 (see FIG. 3) is included. The module 310 is in data communication with an image region module 410. The module 410 is in further data communication with a machine vision processing module 330 (see FIG. 3). The module 330 is in further data communication with a movement module 420. The movement module 420 directs the movement of the system from one location to another location so as to acquire images of different scenes. The data communication may take many forms, as described above in relation to FIG. 3.

Figure 5:
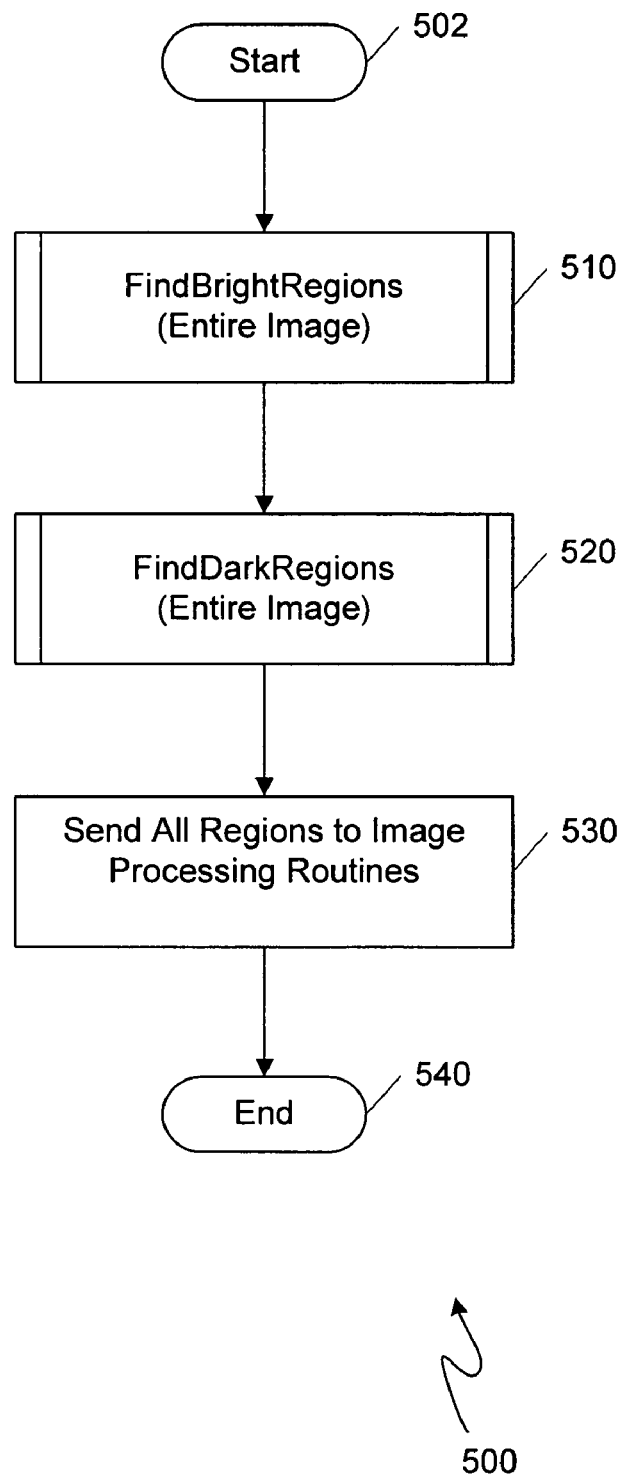
FIG. 5 is a flowchart of an embodiment of the stages of a recursive exposure process in the image sensing and processing system.
Figure 6:
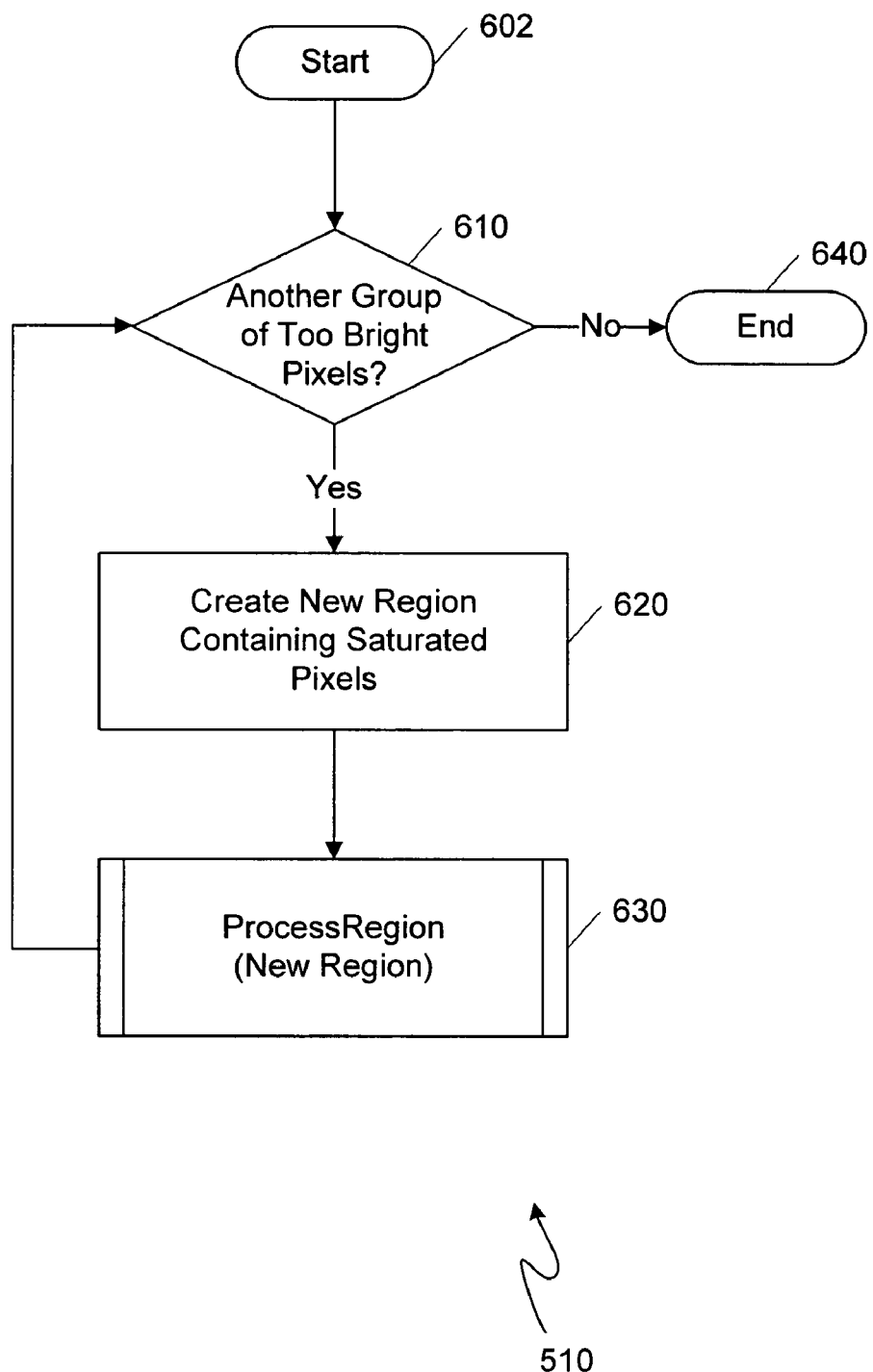
FIG. 6 is a flowchart of an embodiment of the stages of the FindBrightRegions process shown in FIG. 5.
Figure 7:
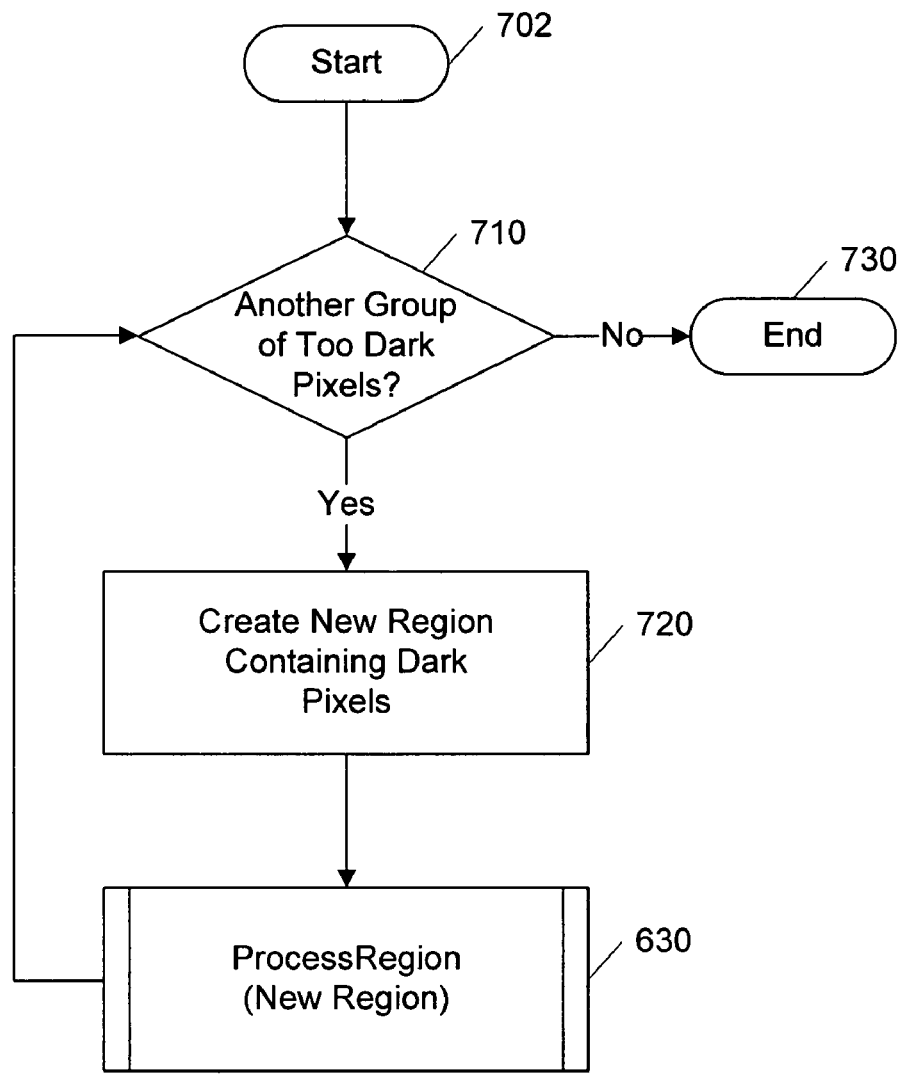
FIG. 7 is a flowchart of an embodiment of the stages of the FindDarkRegions process shown in FIG. 5.
Figure 7:

FIG. 5 is a flowchart of an embodiment of the stages of a recursive exposure process 500 in the image sensing and processing system. As shown in FIG. 5, the recursive exposure process 500 begins at a start stage 502. After the start stage 502, the recursive exposure process 500 proceeds to a FindBrightRegions process 510. The FindBrightRegions process 510, which is described in greater detail below in relation to FIG. 6, is executed for overly bright (saturated) regions 220 of the base image 200. After the FindBrightRegions process 510, the recursive exposure process 500 proceeds to a FindDarkRegions process 520. The FindDarkRegions process 520, which is described in greater detail below in relation to FIG. 7, is executed for overly dark (underexposed) regions 230, 240 of the base image 200. After the FindDarkRegions process 520, the recursive exposure process 500 proceeds to a stage for sending all regions to image processing routines 530. An optical flow analysis is an example of such an image processing routine. For more information on optical flow analysis, see, for example, F.

Bergholm and S. Carlsson, "A "theory" of optical flow", Computer Visions, Graphics, and Image Processing: Image Understanding, vol. 53, pp. 171–188, March 1992, and also see S. Baker and T. Kanade, "Super Resolution Optical Flow", tech. report CMU-RI-TR-99-36, Robotics Institute, Carnegie Mellon University, October 1999, both of which are hereby incorporated by reference in their entirety. After stage 530, the recursive exposure process 500 terminates at an end stage 540.

FIG. 6 is a flowchart of an embodiment of the stages of the FindBrightRegions process 510 shown in FIG. 5. An overly bright region is one in which a group of pixels of sufficient size has values greater than a specified threshold. An example of such an overly bright region is a region in which every pixel is saturated. As shown in FIG. 6, the FindBrightRegions process 510 begins at a start stage 602. After the start stage 602, the FindBrightRegions process 510 proceeds to a decision stage 610. If it is determined at the decision stage 610 that another group of too bright pixels is not present, the FindBrightRegions process 510 terminates at an end stage 640. If, however, it is determined at the decision stage 610 that another group of too bright pixels is present, the FindBrightRegions process 510 proceeds to a create new region containing saturated pixels stage 620. Regions may, for example, be represented by polygons, arrays of pixels (compressed or uncompressed), or chain codes. After stage 620, the FindBrightRegions process 510 proceeds to a ProcessRegion process 630, which is described in greater detail below in relation to FIG. 8.

FIG. 7 is a flowchart of an embodiment of the stages of the FindDarkRegions process 520 shown in FIG. 5. An overly dark region is one in which the average pixel value is less than a specified threshold. One example would be a region in which every pixel has zero intensity, i.e., is black. As shown in FIG. 7, the FindDarkRegions process 520 begins at a start stage 702. After the start stage 702, the FindDarkRegions process 520 proceeds to a decision stage 710. If it is determined at the decision stage 710 that another group of too dark pixels is not present, the FindDarkRegions process 520 terminates at an end stage 730. If, however, it is determined at the decision stage 710 that another group of too dark pixels is present, the FindDarkRegions process 520 proceeds to a stage for creating a new region containing dark pixels 720. After stage 720, the FindDarkRegions process 520 proceeds to a ProcessRegion process 630, which is described in greater detail below in relation to FIG. 8. Referring back to the exemplary base image 200 in FIG. 2, the window 240 and the area through the door 230 are examples of dark regions that are reprocessed using the ProcessRegion process 630.

Figure 8:
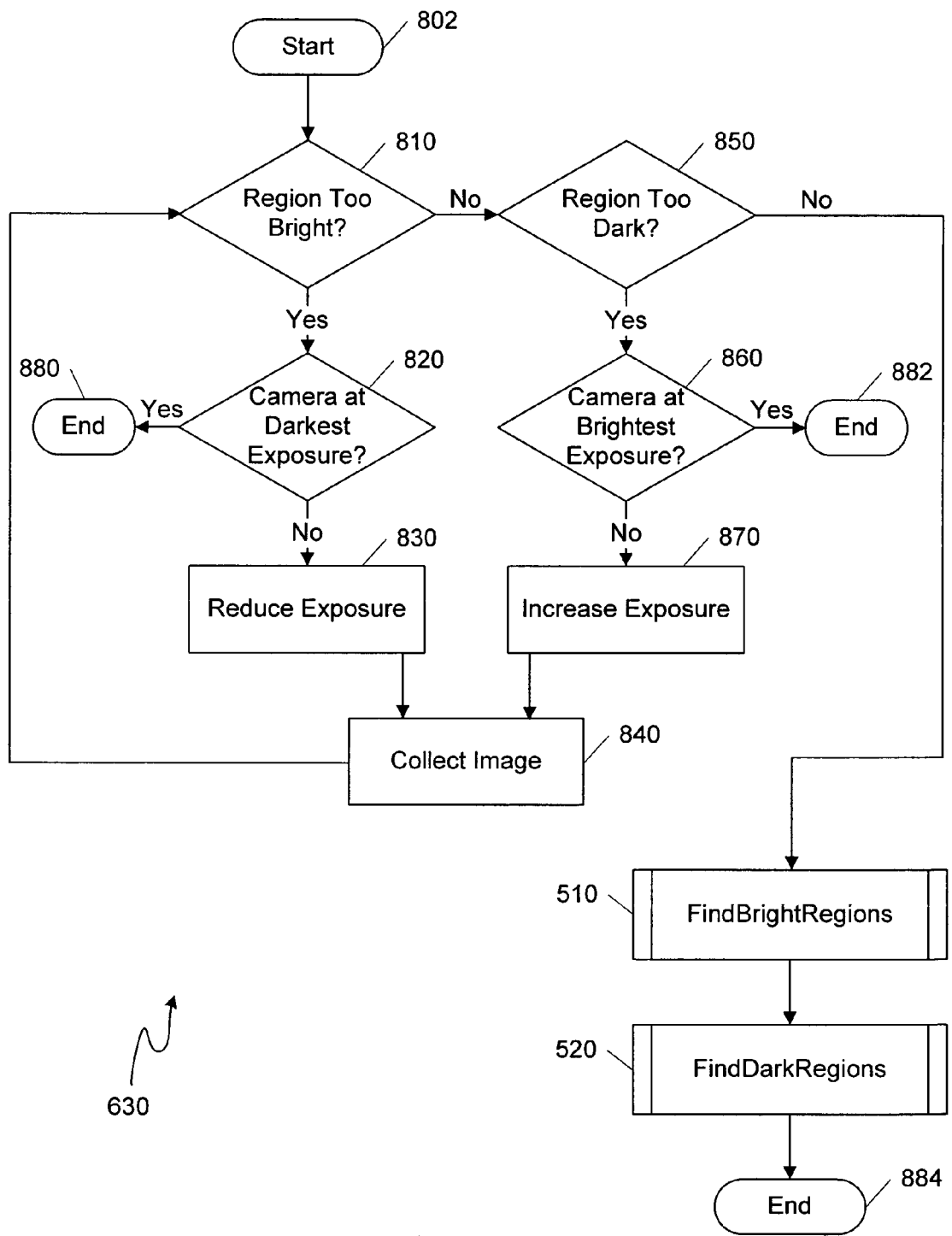
FIG. 8 is a flowchart of one embodiment of the stages of the ProcessRegion process shown in FIGS. 6 and 7.

FIG. 8 is a flowchart of one embodiment of the stages of the ProcessRegion process 630 shown in FIGS. 6 and 7. In this embodiment, each region that is too bright or too dark is analyzed and new images are generated at different exposures using the ProcessRegion process 630 shown in FIG. 8. As shown in FIG. 8, the ProcessRegion process 630 begins at a start stage 802. After the start stage 802, the ProcessRegion process 630 proceeds to a decision stage 810. If it is determined at the decision stage 810 that the corresponding region in the new image is too bright, the ProcessRegion process 630 proceeds to a decision stage 820. If it is determined at the decision stage 820 that the image sensor 101, for example, a camera, is at the darkest (i.e., lowest) exposure, the ProcessRegion process 630 terminates at an end stage 880. If, however, it is determined at the decision stage 820 that the image sensor 101 is not at the lowest exposure, the ProcessRegion process 630 proceeds to a reduce exposure stage 830 to lower the exposure setting of the image sensor 101.

There are various algorithms that may be used to determine the amount to reduce the exposure. For example, in one embodiment, a two-dimensional table lookup is used for which the inputs are the average pixel value in the current region and the current exposure setting. The output of the table lookup in this embodiment is the new exposure setting. In an alternative embodiment, the new exposure setting is calculated such that the ratio of the new exposure setting to the previous exposure setting is substantially equal to the ratio of the desired average pixel value to the current average pixel value. In certain embodiments, the exposure of the image may be enhanced by various techniques, such as, for example, altering the time the image sensor 101 receives light, altering the size of the image sensor 101 lens opening, altering the brightness (e.g., black) setting, altering the contrast (e.g., gain) setting, using a steady light or flash to illuminate the scene, or other pre-capture or post-capture exposure techniques.

After the stage 830, the ProcessRegion process 630 proceeds to the collect image stage 840, which in one embodiment includes the image sensor 101 capturing a new image in a manner similar to the capture of the previous image but with a varied exposure setting. After the stage 840, the ProcessRegion process 630 proceeds to the decision stage 810. After the camera's exposure setting is reduced at stage 830 and the new image is collected at stage 840, the process is repeated until either the average pixel value is within acceptable limits (as described above in relation to decision stages 810 and 850) or no more compensation is possible because the camera exposure setting is at its minimum or maximum value (as described above in relation to decision stages 820 and 860). In those cases in which the end result of this repeated process is that the average pixel value is within acceptable limits, the process is recursively repeated for this region in the image (as shown by the recursive execution of stages 510 and 520 in FIG. 8, which are described above in relation to FIGS. 6 and 7). In other words, the region is checked for groups of too bright pixels by the FindBrightRegions process 510 and groups of too dark pixels by the FindDarkRegions process 520 using the same processes that previously checked the base image 200. Although it is possible that each pixel could have a unique ideal exposure, most images can be optimized with a small number of exposures. In another embodiment, multiple images of the scene are collected at a wide range of different exposures and saved prior to the image processing, which occurs after capture of the images. In this embodiment, the image processing is as described above except that instead of collecting the image at stage 840, the image most closely corresponding to the desired exposure is retrieved and processed.

If, however, at the decision stage 810 it is determined that the region is not too bright, the ProcessRegion process 630 proceeds to a decision stage 850. If it is determined at the decision stage 850 that the region is too dark, the ProcessRegion process 630 proceeds to a decision stage 860. If it is determined at the decision stage 860 that the image sensor is at the brightest exposure, the ProcessRegion process 630 terminates at an end stage 882. If, however, it is determined at decision stage 860 that the image sensor is not at the brightest exposure, the ProcessRegion process 630 proceeds to an increase exposure stage 870.

Various algorithms may be used to determine the amount to increase the exposure. In one embodiment, a two-dimensional table lookup is used for which the inputs are the average pixel value in the current region and the current exposure setting. The output of the table lookup in this embodiment is a new exposure setting. In an alternative embodiment, the new exposure setting is calculated such that the ratio of the new exposure setting to the previous exposure setting is substantially equal to the ratio of the desired average pixel value to the current average pixel value.

After the stage 870, the ProcessRegion process 630 proceeds to the collect image stage 840. After the stage 840, the ProcessRegion process 630 proceeds to the decision stage 810 as described above.

If, however, at decision stage 850, it is determined that the region is not too dark, the ProcessRegion process 630 proceeds to the FindBrightRegions process 510 as described above in relation to FIG. 6. After the FindBrightRegions process 510, the ProcessRegion process 630 proceeds to the FindDarkRegions process 520 as described above in relation to FIG. 7. After the FindDarkRegions process 520, the ProcessRegion process 630 terminates at an end stage 884. End stages 880, 882, 884 in FIG. 8 represent the same end processing instructions, but are drawn as three separate stages only for simplifying the drawing of FIG. 8.

Figure 9:
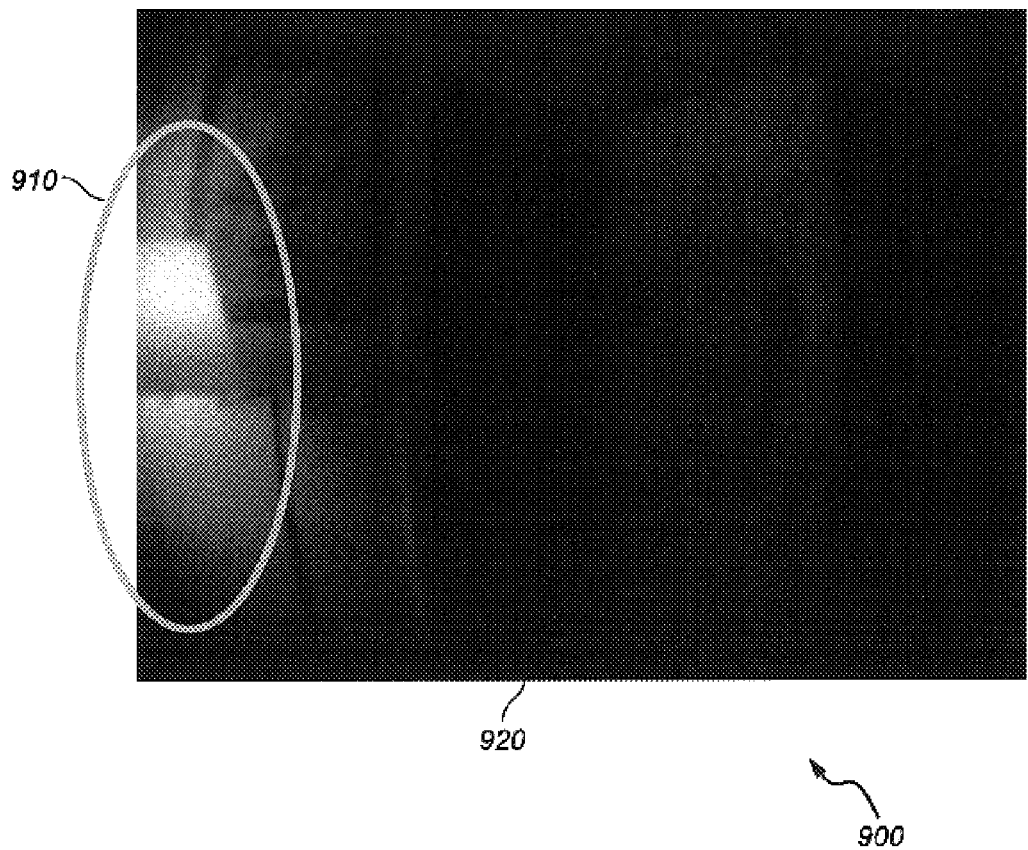
FIG. 9 is a digital image of the base image scene shown in FIG. 2, but taken at a lower level of exposure.

FIG. 9 is a digital image 900 of the base image 200 scene shown in FIG. 2, but taken at a lower level of exposure. The overly bright area 220 from the base image 200 (see FIG. 2) is properly exposed in the image 900 as shown by an area 910. While the remainder of a lower exposure area 920 of the image 900 is not be processed, inspection of FIG. 9 illustrates that this area 920 of the image 900 is underexposed and therefore too dark for the image processing to recognize most objects and/or features.

Figure 10:
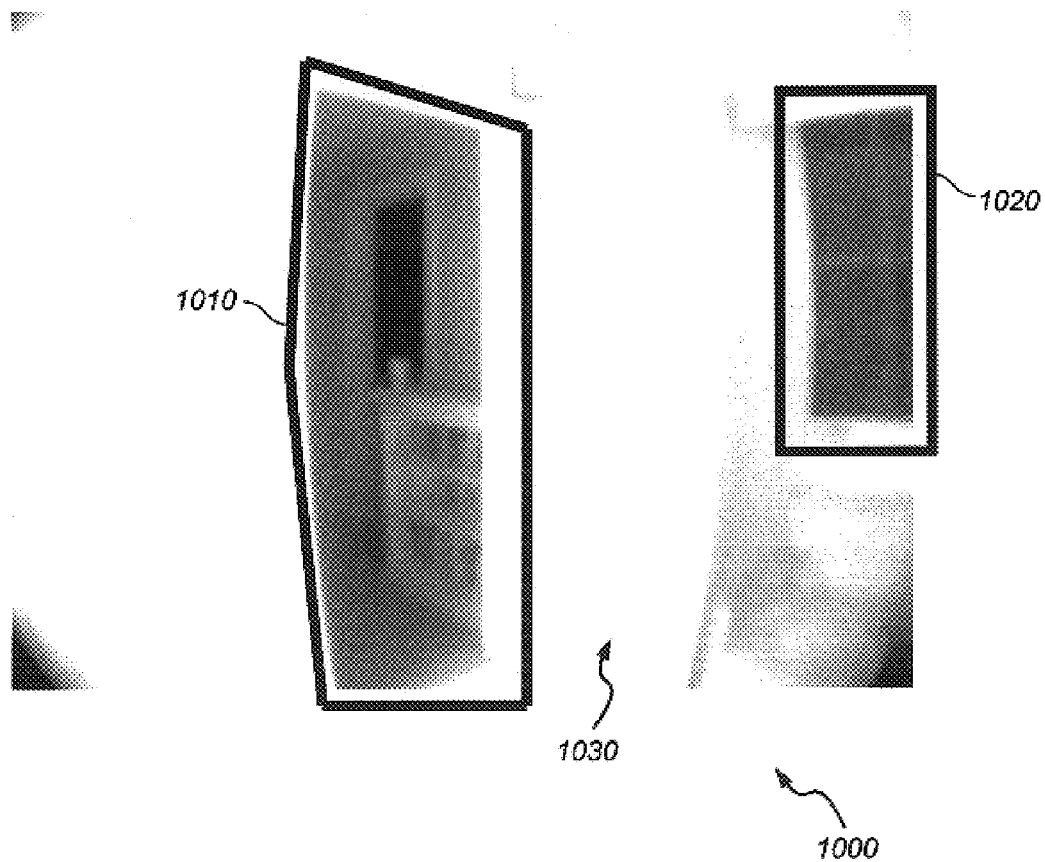
FIG. 10 is a digital image of the base image scene shown in FIG. 2, but taken at a higher level of exposure.

FIG. 10 is a digital image 1000 of the base image 200 scene shown in FIG. 2, but taken at a higher level of exposure. The overly dark areas 230, 240 from the base image 200 are properly exposed in the new image 1000 as shown by areas 1010, 1020, respectively. However, inspection of FIG. 10 illustrates that most of the remaining area 1030 of the image 1000 is overexposed and therefore too light for the image processing to recognize most objects and/or features.

Figure 11:
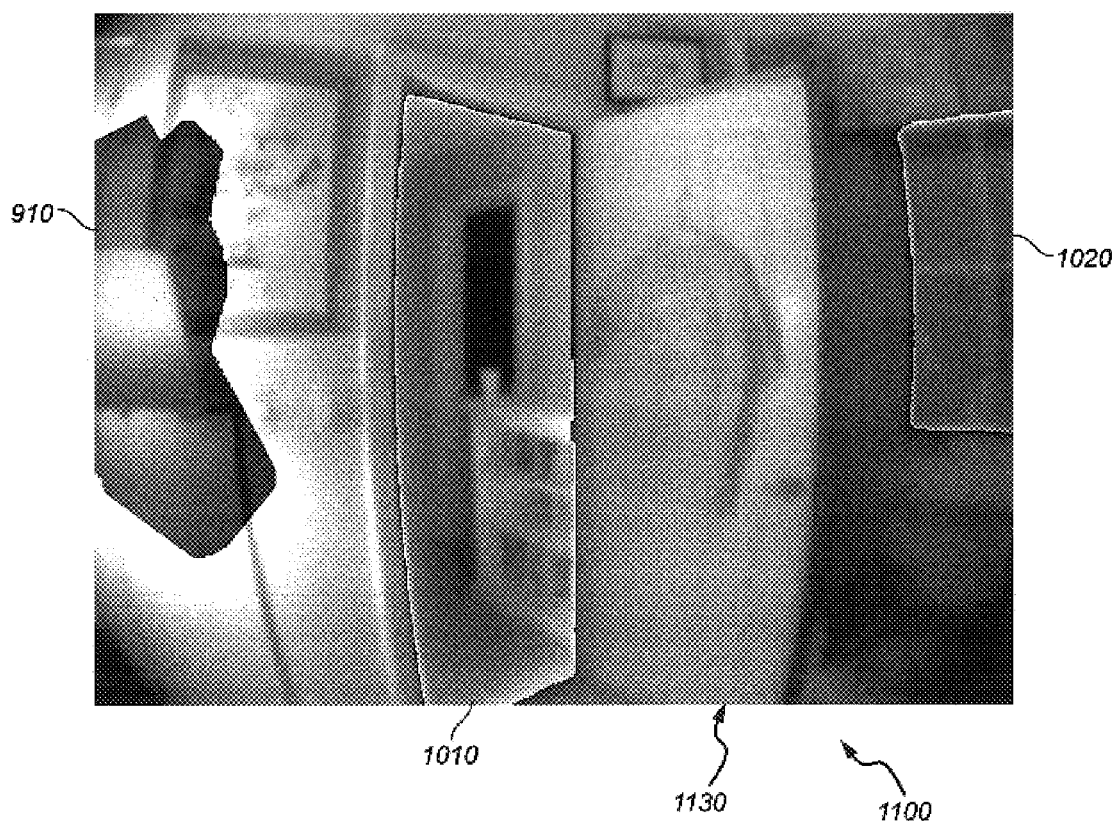
FIG. 11 is a composite image spliced together from the images of FIGS. 2, 9 and 10, using the best-exposed portions of each of the images.

FIG. 11 is a composite image 1100, spliced together from the images shown in FIGS. 2, 9 and 10, using the best-exposed portions of each of the images 200, 900 and 1000. In one embodiment, having processed the overly bright and overly dark regions, the images are ready for the application dependent image processing. In embodiments in which the application utilizes machine vision, the computer analysis generally occurs independently on the properly exposed regions of each image. While there are embodiments of the invention which do not require a composite image, FIG. 11 shows the effective image if such a composite image 1100 were generated. In this embodiment, using the three exposed images 200, 900 and 1000, the majority area 1130 of the composite image 1100 is from the base image 200. The overly bright region 220 in the base image 200 is replaced by the properly exposed region 910 of the underexposed image 900 shown in FIG. 9. The overly dark regions 230, 240 of the base image 200 are replaced by the properly exposed regions 1010, 1020, respectively, of the overexposed image 1000 shown in FIG. 10. In one embodiment, the composite image 1100 may be disjoint as it uses just three exposures and is not subject to further image processing, but as FIG. 11 illustrates, much more detail can be seen in all areas of the composite image 1100 than in the initial base image 200.

In further embodiments, additional exposures are captured that create subregions similar to a ring shape in which progressively larger rings are displayed for a series of images. In such embodiments, the brightness transitions are smoother between regions. In still further embodiments, dynamic scenes or instances in which the image sensor is allowed to move require significantly more image processing, but may be analyzed and processed in a manner similar to that described above. In these embodiments, the region shapes may vary slightly between the different images.

While the above detailed description has shown, described, and pointed out novel features of the invention as applied to various embodiments, it will be understood that various omissions, substitutions, and changes in the form and details of the device or process illustrated may be made by those skilled in the art without departing from the intent of the invention. The scope of the invention is indicated by the appended claims rather than by the foregoing description. All changes that come within the meaning and range of equivalency of the claims are to be embraced within their scope.

What is claimed is:

1. A method of effectively increasing the dynamic range of a machine vision application, the method comprising:
    capturing multiple images of a scene taken at different exposures and with multiple image sensors;
    searching a selected image of the multiple images for overexposed and underexposed portions based on a pixel value indicative of luminance;
    analyzing portions in other images of the multiple images taken at lower exposures corresponding spatially to the overexposed portions in the selected image;
    analyzing portions in other images of the multiple images taken at higher exposures corresponding spatially to the underexposed portions in the selected image; and
    applying feature extraction to at least one of the analyzed portions for distance determination based on relative locations of the features within images associated with the multiple image sensors.

2. The method of claim 1, wherein an image sensor is used to capture the multiple images.

3. The method of claim 2, wherein the image sensor is a digital camera.

4. The method of claim 1, wherein the portions can be overlapping, noncontiguous, or a combination of overlapping and noncontiguous.

5. The method of claim 1, wherein the capturing of multiple images occurs substantially simultaneously.

6. The method of claim 1, additionally comprising generating a composite image for feature extraction based on the analyzed portions that are determined to be properly exposed.

7. The method of claim 1, additionally comprising applying feature extraction to at least a portion of the selected image for distance determination based on relative locations of the features within images associated with the multiple image sensors.

8. A method of effectively increasing the dynamic range of a machine vision application, the method comprising:
    obtaining an image of a scene with multiple image sensors;
    analyzing the image to identify one or more regions that are either too bright or too dark, wherein any one of the regions includes a plurality of pixels;
    for any identified region that is identified as being too bright, obtaining a reduced exposure image;

for any identified region that is identified as being too dark, obtaining an increased exposure image; and analyzing one or more of the properly exposed regions of the image or one or more properly exposed regions in the reduced and/or increased exposure images, wherein analyzing comprises feature extraction for distance determination based on relative locations of the features within images associated with the multiple image sensors.

9. The method defined in claim 8, wherein an image sensor is used to obtain the images.

10. The method defined in claim 9, wherein the camera includes a CCD or CMOS sensor.

11. The method of claim 9, wherein the image sensor is a digital camera.

12. The method defined in claim 8, wherein the regions can be overlapping, noncontiguous, or a combination of overlapping and noncontiguous.

13. The method defined in claim 8, additionally comprising obtaining another image at a reduced exposure if the image sensor has a lower exposure setting available.

14. The method defined in claim 8, additionally comprising obtaining another image at an increased exposure if the image sensor has a higher exposure setting available.

15. The method defined in claim 8, wherein the obtaining a reduced exposure image and/or obtaining an increased exposure image are repeated as long as an average pixel value of any region is not within a selected limit.

16. The method defined in claim 8, additionally comprising:

analyzing the properly exposed regions in the reduced and/or increased exposure images to identify one or more subregions that are either too bright or too dark;

for any identified subregion that is too bright, obtaining another reduced exposure image;

for any identified subregion that is too dark, obtaining another increased exposure image; and processing the properly exposed region and one or more properly exposed subregions in the reduced and/or increased exposure images.

17. The method defined in claim 8, wherein the image sensor is mounted on a mobile robot and wherein the method is repeated for a plurality of scenes looking for objects, including both landmarks and obstacles, to plan the movement of the mobile robot.

18. The method of claim 8, wherein the obtaining of the image, the obtaining of the reduced exposure image, and the obtaining of the increased exposure image occurs substantially simultaneously.

19. The method defined in claim 8, additionally comprising generating a composite image for feature extraction from the one or more properly exposed regions of the image and the one or more properly exposed regions in the reduced and/or increased exposure images.

20. A computer program storage medium storing instructions that when executed by a processor perform a method of increasing the dynamic range of a machine vision application, the method comprising:

obtaining a base image of a scene with multiple image sensors;

analyzing the base image to identify one or more regions that are either too bright or too dark, wherein any one of the regions includes a plurality of pixels;

for any identified region that is too bright, obtaining a reduced exposure image;

for any identified region that is too dark, obtaining an increased exposure image; and analyzing the base image and one or more properly exposed regions in the reduced and/or increased exposure images, wherein analyzing comprises feature extraction for distance determination based on relative locations of features within images associated with the multiple image sensors.

21. The storage medium of claim 20, wherein an image sensor is used to obtain the base image, reduced exposure image, or increased exposure image.

22. The storage medium of claim 21, wherein the image sensor is a digital camera.

23. The storage medium of claim 20, wherein the regions can be overlapping, noncontiguous, or a combination of overlapping and noncontiguous.

24. The storage medium of claim 20, wherein the obtaining of the base image, the obtaining of the reduced exposure image, and the obtaining of the increased exposure image occurs substantially simultaneously.

25. The storage medium of claim 20, additionally comprising generating a composite image for feature extraction from the base image and the one or more properly exposed regions in the reduced and/or increased exposure images.

26. The method of claim 20, wherein the analyzing comprises feature extraction for object identification.

27. An image sensing system for effectively increasing the dynamic range of a machine vision application, the system comprising:

means for acquiring an image of a scene a plurality of times with different exposures using multiple image sensors to obtain a plurality of images;

means for segmenting the images into a plurality of image regions, wherein each region is indicative of a selected dynamic range; and means for analyzing one or more of the plurality of image regions for feature extraction including distance determination based on relative locations of the features within images associated with the multiple image sensors.

28. The system of claim 27, wherein an image sensor is used to acquire the image.

29. The system of claim 28, wherein the image sensor is a digital camera.

30. The system of claim 27, wherein the image sensing system includes at least two image sensors offset from each other.

31. The system of claim 30, wherein the machine vision application utilizes corresponding image segments from the at least two image sensors to determine distance and/or orientation from the camera system to the object or feature being imaged.

32. The system of claim 31, wherein the imaging sensing system generates a composite image for feature extraction including object identification and localization, edge detection and pattern recognition.

33. The system of claim 27, wherein the imaging sensing system generates a composite image for feature extraction including object identification and localization, edge detection and pattern recognition.

34. The system of claim 27, wherein the regions can be overlapping, noncontiguous, or a combination of overlapping and noncontiguous.

35. The system of claim 27, wherein the acquiring of the image of the scene a plurality of times occurs substantially simultaneously.

36. A method of effectively increasing the dynamic range of a machine vision application, the method comprising:

acquiring an image of a scene a plurality of times with different exposures using multiple image sensors to obtain a plurality of images;

segmenting the images into a plurality of image regions, wherein each region is indicative of a selected dynamic range; and analyzing any one or more of the plurality of image regions, wherein analyzing comprises feature extraction for distance determination based on relative locations of features within images associated with the multiple image sensors.

37. The method of claim 36, wherein an image sensor is used to acquire the image.

38. The method of claim 37, wherein the image sensor is a digital camera.

39. The method of claim 36, wherein the acquiring of the image of the scene a plurality of times occurs substantially simultaneously.

40. The method of claim 15, additionally comprising generating a composite image for feature extraction based on the image regions being within a selected dynamic range.

41. The method of claim 36, wherein the analyzing comprises feature extraction for object identification.

42. An image acquisition system for effectively increasing the dynamic range of a machine vision application, the system comprising:

means for acquiring a plurality of images of a scene with multiple image sensors, each image having a different exposure;

means for obtaining a plurality of image regions, wherein each region contains portions of a particular image with good dynamic range from the plurality of images; and means for analyzing one or more of the plurality of image regions for feature extraction including distance determination based on relative locations of the features within images associated with the multiple image sensors.

43. The system of claim 42, further comprising means for moving the system from one location to another location so as to acquire images of different scenes.

44. The system of claim 42, wherein an image sensor is used to acquire the plurality of images.

45. The system of claim 44, wherein the image sensor is a digital camera.

46. The system of claim 42, wherein the image sensing system contains at least two image sensors offset from each other.

47. The system of claim 46, wherein the machine vision application utilizes corresponding image segments from the at least two image sensors to determine distance and/or orientation from the camera system to the object or feature being imaged.

48. The system of claim 42, wherein the imaging sensing system generates a composite image for feature extraction including object identification and localization, edge detection and pattern recognition.

49. The system of claim 47, wherein the imaging sensing system generates a composite image for feature extraction including object identification and localization, edge detection and pattern recognition.

50. The system of claim 42, wherein the means for acquiring the plurality of images of the scene is a means for acquiring the plurality of images of the scene substantially simultaneously.

51. A method of effectively increasing the dynamic range of a machine vision application, the method comprising:

capturing multiple images of a scene taken in different lighting conditions and with multiple image sensors;

searching an image of the multiple images for overexposed and underexposed portions based on a pixel value indicative of luminance;

reanalyzing the overexposed portions and the underexposed portions in the selected image corresponding to a spatially related portion in other images of the multiple images taken in different lighting conditions; and analyzing at least one of the reanalyzed portions, wherein analyzing comprises feature extraction for distance determination based on relative locations of the features within images associated with the multiple image sensors.

52. The method of claim 51, wherein an image sensor is used to capture the multiple images.

53. The method of claim 52, wherein the image sensor is a digital camera.

54. The method of claim 51, wherein the portions can be overlapping, noncontiguous, or a combination of overlapping and noncontiguous.

55. The method of claim 51, wherein the different light conditions include one or more flashes of light.

56. The method of claim 51, wherein the capturing multiple images occurs substantially simultaneously.

57. The method of claim 51, additionally comprising generating a composite image for feature extraction based on the reanalyzed portions that are determined to be properly exposed.

58. The method of claim 51, additionally comprising analyzing at least a portion of the image of the multiple images, wherein analyzing comprises feature extraction for distance determination based on relative locations of the features within images associated with the multiple image sensors.

59. An image sensing system for effectively increasing the dynamic range of a machine vision application, the system comprising:

means for acquiring an image of a scene a plurality of times under different lighting conditions and with multiple image sensors so as to obtain a plurality of images;

means for segmenting the images into a plurality of image regions, wherein each region is indicative of a selected dynamic range; and means for analyzing one or more of the plurality of image regions for feature extraction including distance determination based on relative locations of the features within images associated with the multiple image sensors.

60. The system of claim 59, wherein one or more image sensor is used to acquire the image.

61. The system of claim 60, wherein the one or more image sensor is one or more digital camera.

62. The system of claim 59, wherein the different lighting conditions include the use of one or more flashes of light.

63. The system of claim 59, wherein the image sensing system contains at least two image sensors offset from each other.

64. The system of claim 63, wherein the machine vision application utilizes corresponding image segments from the at least two image sensors to determine distance and/or orientation from the camera system to the object or feature being imaged.

65. The system of claim 64, wherein the imaging sensing system generates a composite image for feature extraction including object identification and localization, edge detection and pattern recognition.

66. The system of claim 59, wherein the imaging sensing system generates a composite image for feature extraction including object identification and localization, edge detection and pattern recognition.

67. The system of claim 59, wherein the means for acquiring the image of the scene a plurality of times is a means for acquiring the image of the scene a plurality of times substantially simultaneously.

68. A method to improve the performance of a machine vision system by increasing the amount of data captured within images of a scene, the method comprising:
obtaining multiple images of a scene taken at different exposures and with multiple image sensors, wherein one of the multiple images is designated as a base image;
analyzing properly exposed portions of the base image;
analyzing regions in higher exposure images that correspond to pixels in the base image that were underexposed;
analyzing regions in the lower exposure images that correspond to pixels in the base image that were overexposed; and
applying feature extraction to at least one of the analyzed portions or regions for distance determination based on relative locations of the features within images associated with the multiple image sensors.

69. The method of claim 68, wherein the features include landmarks for use with a vision based robot.

70. The method of claim 68, wherein subregions of the higher exposure images remain overexposed and subregions of the lower exposure images remain underexposed, and wherein the method further comprises analyzing corresponding subregions of images with still higher and lower exposures.

71. The method of claim 68, wherein the obtaining multiple images occurs substantially simultaneously.

72. The method of claim 68, additionally comprising generating a composite image for feature extraction based on the regions and portions that are determined to be properly exposed.

73. A method of effectively increasing the dynamic range of an image sensor, the method comprising:
obtaining an image of a scene;
analyzing the image to identify one or more regions that are either too bright or too dark, wherein any one of the regions includes a plurality of pixels;
for any identified region that is identified as being too bright, obtaining a reduced exposure image;
for any identified region that is identified as being too dark, obtaining an increased exposure image;
wherein the obtaining a reduced exposure image and/or obtaining an increased exposure image are repeated as long as an average pixel value of any region is not within a selected limit; and
processing one or more of the properly exposed regions of the image and one or more properly exposed regions in the reduced and/or increased exposure images.

74. A method of effectively increasing the dynamic range of an image sensor, the method comprising:
obtaining an image of a scene;
analyzing the image to identify one or more regions that are either too bright or too dark, wherein any one of the regions includes a plurality of pixels;
for any identified region that is identified as being too bright, obtaining a reduced exposure image;
for any identified region that is identified as being too dark, obtaining an increased exposure image;
processing one or more of the properly exposed regions of the image and one or more properly exposed regions in the reduced and/or increased exposure images;
analyzing the properly exposed regions in the reduced and/or increased exposure images to identify one or more subregions that are either too bright or too dark;
for any identified subregion that is too bright, obtaining another reduced exposure image;
for any identified subregion that is too dark, obtaining another increased exposure image; and
processing the properly exposed region and, one or more properly exposed subregions in the reduced and/or increased exposure images.

75. A method to improve the performance of a machine vision system by increasing the amount of data captured within images of a scene, the method comprising:
obtaining multiple images of a scene taken at different exposures, wherein one of the multiple images is designated as a base image;
analyzing features in properly exposed portions of the base image;
analyzing features in regions in higher exposure images that correspond to pixels in the base image that were underexposed;
analyzing features in regions in the lower exposure images that correspond to pixels in the base image that were overexposed, wherein subregions of the higher exposure images remain overexposed and subregions of the lower exposure images remain underexposed;
analyzing features in corresponding subregions of images with still higher and lower exposures; and
processing at least one of the analyzed features with a machine vision application associated with mapping, navigation, or localization.

76. A method to effectively improve the performance of a machine vision system, the method comprising:
capturing multiple images of a scene taken at different exposures using a plurality of image sensors;
analyzing at least a selected one of the images by applying feature extraction;
if regions of the at least selected one analyzed image are too dark or too light,
analyzing portions in other images of the multiple images taken at higher exposures corresponding spatially to the regions in the selected analyzed image that are too underexposed, and
analyzing portions in other images of the multiple images taken at lower exposures corresponding spatially to the regions in the selected analyzed image that are too overexposed; and
determining a distance from the image sensors to at least one extracted feature based on relative locations of the features within images associated with the plurality of image sensors.

77. The method of claim 76, wherein applying feature extraction includes matching at least one feature in images from one of the image sensors to a corresponding feature in images from another one of the image sensors.

78. The method of claim 76, wherein a feature is recognized when there is sufficient contrast to match the feature between images of the image sensors.

79. The method of claim 76, wherein the image sensors are offset from each other.

80. The method of claim 76, wherein capturing multiple images of a scene taken at different exposures comprises capturing the multiple images at the same time at each of the image sensors.

81. The method of claim 76, wherein capturing multiple images of a scene taken at different exposures comprises capturing the multiple images at different times at each of the image sensors.

82. The method of claim 76, wherein capturing multiple images of a scene taken at different exposures comprises capturing the multiple images for at least one exposure at one image sensor that is different from at least another exposure at another image sensor.

83. The method of claim 76, wherein the image sensors are configured to capture multiple images of a scene with the same or different exposure settings.

84. The method of claim 76, wherein the analysis of the selected image or portions in other images is performed independently for the images captured by each of the image sensors.

85. The method of claim 76, wherein the analysis of the selected image or portions in other images comprises using the same exposures for corresponding portions in the images captured from the image sensors.

86. A method of effectively increasing the dynamic range of a machine vision application, the method comprising:
    capturing multiple images of a scene taken at different exposures using a plurality of image sensors;
    analyzing a selected image of the multiple images for overexposed and underexposed portions based on a pixel value indicative of luminance;
    analyzing portions in other images of the multiple images taken at lower exposures corresponding spatially to the overexposed portions in the selected image;
    analyzing portions in other images of the multiple images taken at higher exposures corresponding spatially to the underexposed portions in the selected image; and
    applying feature extraction to at least one of the analyzed portions for distance determination based on relative locations of the features within images associated with the plurality of image sensors.

87. The method of claim 86, wherein the image sensors are offset from each other.

88. The method of claim 86, wherein capturing multiple images of a scene taken at different exposures comprises capturing the multiple images at the same time at each of the image sensors.

89. The method of claim 86, wherein capturing multiple images of a scene taken at different exposures comprises capturing the multiple images at different times at each of the image sensors.

90. The method of claim 86, wherein capturing multiple images of a scene taken at different exposures comprises capturing the multiple images for at least one exposure at one image sensor that is different from at least another exposure at another image sensor.

91. The method of claim 86, wherein the image sensors are configured to capture multiple images of a scene with the same or different exposure settings.

92. The method of claim 86, wherein the analysis of the selected image or portions in other images is performed independently for the images captured by each of the image sensors.

93. The method of claim 86, wherein the analysis of the selected image or portions in other images comprises using the same exposures for corresponding portions in the images captured from the image sensors.

94. The method of claim 86, wherein applying feature extraction includes matching at least one feature in images from one of the image sensors to a corresponding feature in images from another one of the image sensors.

95. The method of claim 86, wherein the determination of distance is from the image sensors to an extracted feature.

96. The method of claim 95, wherein the extracted feature is recognized when there is sufficient contrast to match the feature between images of the image sensors.

97. An image sensing system for effectively increasing the dynamic range of a machine vision application, the system comprising:
    means for acquiring an image of a scene a plurality of times with different exposures to obtain a plurality of images;
    means for segmenting the images into a plurality of image regions, wherein each region is indicative of a selected dynamic range;
    means for analyzing one or more of the plurality of image regions for feature extraction including object identification or distance determination; and
    wherein the image sensing system includes at least two image sensors offset from each other, and wherein the machine vision application utilizes corresponding image segments from the at least two image sensors to determine distance and/or orientation from the camera system to the object or feature being imaged.

98. An image acquisition system for effectively increasing the dynamic range of a machine vision application, the system comprising:
    means for acquiring a plurality of images of a scene, each image having a different exposure;
    means for obtaining a plurality of image regions, wherein each region contains portions of a particular image with good dynamic range from the plurality of images;
    means for analyzing one or more of the plurality of image regions for feature extraction including distance determination; and
    wherein the image sensing system contains at least two image sensors offset from each other, and wherein the machine vision application utilizes corresponding image segments from the at least two image sensors to determine distance and/or orientation from the camera system to the object or feature being imaged.

99. An image sensing system for effectively increasing the dynamic range of a machine vision application, the system comprising:
    means for acquiring an image of a scene a plurality of times under different lighting conditions so as to obtain a plurality of images;
    means for segmenting the images into a plurality of image regions, wherein each region is indicative of a selected dynamic range;
    means for analyzing one or more of the plurality of image regions for feature extraction including distance determination; and
    wherein the image sensing system contains at least two image sensors offset from each other, and wherein the machine vision application utilizes corresponding image segments from the at least two image sensors to determine distance and/or orientation from the camera system to the object or feature being imaged.

* * * * *

UNITED STATES PATENT AND TRADEMARK OFFICE
CERTIFICATE OF CORRECTION

PATENT NO. : 7,133,069 B2  Page 1 of 1
APPLICATION NO. : 10/100221
DATED : November 7, 2006
INVENTOR(S) : Bret A. Wallach et al.

It is certified that error appears in the above-identified patent and that said Letters Patent is hereby corrected as shown below:

| Column | Line | Description of Error |
|--------|------|----------------------|
| 11 | 3 | Change "1992" to --1991--. |
| 17 | 19 | In Claim 40, change "15" to --36--. |
| 20 | 11 | In Claim 74, change "and," to --and--. |

Signed and Sealed this

Twenty-fourth Day of November, 2009

David J. Kappos
*Director of the United States Patent and Trademark Office*